(12) United States Patent
Chen et al.

(10) Patent No.: US 11,791,930 B2
(45) Date of Patent: Oct. 17, 2023

(54) UPLINK CONTROL INFORMATION TRANSMISSION/CONFIGURATION INDICATION METHOD AND DEVICE, TERMINAL AND BASE STATION

(71) Applicant: ZTE CORPORATION, Guangdong (CN)

(72) Inventors: Yijian Chen, Guangdong (CN); Zhaohua Lu, Guangdong (CN); Yungok Li, Guangdong (CN); Bo Gao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 51 days.

(21) Appl. No.: 17/330,799

(22) Filed: May 26, 2021

(65) Prior Publication Data

US 2021/0298010 A1    Sep. 23, 2021

Related U.S. Application Data

(63) Continuation of application No. 16/335,940, filed as application No. PCT/CN2017/103690 on Sep. 27, 2017, now Pat. No. 11,051,282.

(30) Foreign Application Priority Data

Sep. 30, 2016   (CN) .......................... 201610877956.9

(51) Int. Cl.
*H04L 1/00* (2006.01)
*H04B 7/0417* (2017.01)
(Continued)

(52) U.S. Cl.
CPC .......... *H04L 1/0031* (2013.01); *H04B 7/0417* (2013.01); *H04B 7/0626* (2013.01);
(Continued)

(58) Field of Classification Search
CPC .. H04B 7/0417; H04B 7/0626; H04B 7/0632; H04B 7/0639; H04L 1/06; H04L 1/16; H04L 5/0007; H04L 5/0053; H04L 5/0055; H04L 5/0057; H04L 27/2607; H04L 27/2628; H04W 72/04; H04W 72/0406;
(Continued)

(56) References Cited

U.S. PATENT DOCUMENTS 8,908,596 B2 * 12/2014 Han .................... H04B 7/0413
370/344
9,271,271 B2 * 2/2016 Papasakellariou .... H04W 72/21
(Continued)

FOREIGN PATENT DOCUMENTS

EP        3107337 A2 * 12/2016 ............. H04L 5/001
WO  WO-2010018226 A2 *  2/2010 ........... H04L 5/0005

*Primary Examiner* — Eric Nowlin
(74) *Attorney, Agent, or Firm* — KDW Firm PLLC

(57) ABSTRACT

Provided is an uplink control information transmission/configuration indication method and device, a terminal, and a base station. The uplink control information transmission method includes: determining a transmission configuration set corresponding to uplink control information to be sent, selecting a transmission configuration from the transmission configuration set, and transmitting the uplink control information to be sent according to the selected transmission configuration.

10 Claims, 6 Drawing Sheets

Determine a transmission configuration set corresponding to uplink control information to be sent — S102

Select a transmission configuration from the transmission configuration set — S104

Select a transmission configuration from the transmission configuration set — S106

(51) Int. Cl.

| | |
|---|---|
| *H04B 7/06* | (2006.01) |
| *H04L 27/26* | (2006.01) |
| *H04W 72/04* | (2023.01) |
| *H04L 1/06* | (2006.01) |
| *H04W 72/12* | (2023.01) |
| *H04L 1/16* | (2023.01) |
| *H04W 72/21* | (2023.01) |
| *H04W 72/23* | (2023.01) |
| *H04W 72/53* | (2023.01) |
| *H04W 72/54* | (2023.01) |
| *H04W 72/50* | (2023.01) |
| *H04L 5/00* | (2006.01) |

(52) U.S. Cl.
CPC .......... *H04B 7/0632* (2013.01); *H04B 7/0639* (2013.01); *H04L 1/06* (2013.01); *H04L 1/16* (2013.01); *H04L 27/2607* (2013.01); *H04L 27/2628* (2013.01); *H04W 72/04* (2013.01); *H04W 72/12* (2013.01); *H04W 72/21* (2023.01); *H04W 72/23* (2023.01); *H04W 72/53* (2023.01); *H04W 72/535* (2023.01); *H04W 72/54* (2023.01); *H04L 5/0007* (2013.01)

(58) Field of Classification Search
CPC ........... H04W 72/0413; H04W 72/042; H04W 72/0493; H04W 72/12; H04W 72/1226; H04W 72/1257; H04W 72/1284
See application file for complete search history.

(56) References Cited

U.S. PATENT DOCUMENTS

| | | | | |
|---|---|---|---|---|
| 9,485,060 B2* | 11/2016 | Nayeb Nazar | ........ | H04L 5/0053 |
| 9,520,984 B2* | 12/2016 | Yang | ......................... | H04L 1/18 |
| 9,629,152 B2* | 4/2017 | Han | ...................... | H04W 72/20 |
| 9,692,575 B2* | 6/2017 | Kwak | .................. | H04J 13/0074 |
| 9,749,969 B2* | 8/2017 | Zhang | ................ | H04W 72/0413 |
| 9,887,810 B2* | 2/2018 | Shimezawa | ........... | H04W 72/20 |
| 9,955,356 B2* | 4/2018 | Xiong | ................... | H04L 1/1671 |
| 9,967,866 B2* | 5/2018 | Nayeb Nazar | ........ | H04L 1/0073 |
| 10,257,853 B2* | 4/2019 | Yerramalli | ............. | H04W 72/21 |
| 10,595,312 B2* | 3/2020 | Yeo | ....................... | H04L 5/0048 |
| 10,966,234 B2* | 3/2021 | Li | .......................... | H04L 5/0055 |
| 11,290,991 B2* | 3/2022 | Choi | .................... | H04W 36/0069 |
| 11,399,346 B2* | 7/2022 | Choi | .................... | H04W 76/16 |
| 11,641,255 B2* | 5/2023 | Dinan | ................... | H04L 5/0094 370/329 |
| 2010/0067472 A1* | 3/2010 | Ball | ..................... | H04L 5/0053 370/329 |
| 2011/0002322 A1* | 1/2011 | Kim | ..................... | H04J 11/0023 370/344 |
| 2011/0243066 A1* | 10/2011 | Nayeb Nazar | ........ | H04L 5/0016 370/328 |
| 2012/0113831 A1* | 5/2012 | Pelletier | ................ | H04L 5/0053 370/252 |
| 2013/0230030 A1* | 9/2013 | Papasakellariou | .... | H04L 1/1861 370/336 |
| 2014/0119304 A1* | 5/2014 | Li | .......................... | H04L 5/0082 370/329 |
| 2015/0023312 A1* | 1/2015 | Kwak | ............... | H04W 72/0406 370/329 |
| 2015/0098453 A1* | 4/2015 | Han | ...................... | H04W 72/21 370/336 |
| 2015/0215930 A1* | 7/2015 | Kim | ..................... | H04L 5/0055 370/329 |
| 2015/0319753 A1* | 11/2015 | Chen | ..................... | H04L 5/001 370/329 |
| 2015/0358924 A1* | 12/2015 | Papasakellariou | ........................... | H04W 72/0473 370/329 |
| 2016/0323833 A1* | 11/2016 | Zhang | .................... | H04W 52/16 |
| 2017/0013612 A1* | 1/2017 | Nayeb Nazar | .... | H04W 72/0446 |
| 2019/0313397 A1* | 10/2019 | Chen | ................. | H04W 72/0413 |
| 2020/0213998 A1* | 7/2020 | Sun | ...................... | H04L 27/261 |
| 2020/0351865 A1* | 11/2020 | Choi | .................... | H04L 1/1854 |
| 2021/0243700 A1* | 8/2021 | Choi | .................... | H04W 76/16 |
| 2022/0225326 A1* | 7/2022 | Choi | .................... | H04L 1/1861 |

\* cited by examiner

UPLINK CONTROL INFORMATION TRANSMISSION/CONFIGURATION INDICATION METHOD AND DEVICE, TERMINAL AND BASE STATION

CROSS-REFERENCES TO RELATED APPLICATIONS

The present application is a continuation application of U.S. patent application Ser. No. 16/335,940, filed on May 8, 2019, which is a U.S. National Stage Application, filed under 35 U.S.C. 371, of International Patent Application No. PCT/CN2017/103690, filed on Sep. 27, 2017, which claims priority to Chinese patent application No. 201610877956.9 filed on Sep. 30, 2016, contents of all of which are incorporated herein by reference in their entireties.

TECHNICAL FIELD

The present disclosure relates to communications and, in particular, to an uplink control information transmission/configuration indication method and device, a terminal and a base station.

BACKGROUND

In a communication system, user equipment (UE) needs to send necessary uplink physical layer (L1) control information at a physical layer (L1) and uplink control information at a medium access control (MAC) layer (L2) to support uplink and downlink data transmission. In an example of a long-term evolution/long-term evolution advance (LTE/LTE-A) system, the L1/L2 uplink control information (UCI) includes a scheduling request (SR), a hybrid automatic repeat request (HARQ) acknowledgement/negative acknowledgement (ACK/NACK) and channel state information (CSI).

The SR is used for requesting uplink shared channel (UL-SCH) resources from an eNodeB;

The HARQ-ACK/NACK is used for HARQ acknowledge downlink data sent on a data channel, a physical downlink share channel (PDSCH).

The CSI includes a channel quality indication (CQI), a precoding matrix indicator/index (PMI), a rank indicator (RI), a channel state information reference signal (CSI-RS) resource indicator/index resource indicator/index (CRI) and the like, and is used for notifying an eNodeB of a downlink channel quality to help the eNodeB with downlink scheduling.

The control information in the LTE is transmitted in two manners. If no uplink resource in a current subframe is allocated to UE for sending uplink data, the UE sends the L1/L2 uplink control information in the physical uplink control channel (PUCCH). If one or more uplink resources in the current subframe are allocated to the UE for sending the uplink data, the UE sends the L1/L2 uplink control information on part of resources allocated to the physical shared control channel (PUSCH). If the resources have been allocated to the UE for sending the uplink data, it is not necessary to send the SR. In the case of carrier aggregation (CA), the control information of multiple carriers may be aggregated together for sending.

For control transmission on the PUCCH, there are several uplink control channel formats. As shown in Table 1, each format corresponds to different control information.

TABLE 1

| Format | Information |
|---|---|
| 1 | SR |
| 1a | 1-bit ACK/NACK with/without SR |
| 1b | 2-bit ACK/NACK with/without SR |
| 2 | 20-bit CSI |
| 2 | 20-bit CSI + 1 or 2-bit ACK/NACK (only for extended CP) |
| 2a | 20-bit CSI + 1-bit ACK/NACK (only for normal CP) |
| 2b | 20-bit CSI + 2-bit ACK/NACK (only for normal CP) |
| 3 | For FDD, up to 10-bit ACK/NACK; For frequency division duplex TDD, up to 20-bit ACK/NACK |
| 3 | For FDD, up to 10-bit ACK/NACK + 1-bit SR; For TDD, up to 20-bit ACK/NACK + 1-bit SR |

It can be seen from the above table that different types of control information may be separately transmitted, or may be transmitted in combination with other types of control information, thereby respectively forming different formats. The transmission of the same format in the same antenna configuration has a relatively fixed design and cannot be flexibly changed. The robustness of the transmitted content is the primary consideration in the LTE. A low error rate is required in transmission of the control information, because an error in the control information may cause more serious consequences than an error in data information. Therefore, the control information is transmitted in the most robust manner. The uplink control channel generally distinguishes different users through code division. The code division may adopt different orthogonal sequences or perform cyclic shift with the same sequence to achieve orthogonality.

The LTE/LTE-A is mainly intended for frequencies with relatively low communication frequencies. At this time, the path loss in the system is not large. But with the development and utilization of high frequencies, the communication frequency of the system is getting higher, and is gradually extended up to 4 GHz, 30 GHz and even 70 GHz. At this time, the path loss will significantly increase. In order to reduce the path loss at the high frequency, beam transmission is used to acquire beamforming gain so that coverage of the control channel can be ensured, which has become a trend. However, the beam transmission requires real-time accurate CSI. In the actual system, due to the blocking of the transmission path and the movement of a terminal, the rotation of the terminal may affect the accuracy of the beam. In this case, the robustness of the control channel is challenged.

At present, if the uplink control information is transmitted in the most robust manner, the uplink control information is required to be transmitted in all beam directions, each direction needs to occupy resources, and the number of beams is generally twice the number of antennas. In this case, a large amount of resources are required. Nevertheless, if the uplink control information is transmitted in the manner with the highest transmission efficiency, the robustness cannot be guaranteed. In a word, the beam always lacks measurement accuracy and real-time capability. Therefore, there is a lack of a transmission manner that guarantees both robustness and high transmission efficiency at the same time during the transmission of the control information.

Therefore, both robustness and high transmission efficiency cannot be guaranteed at the same time during information transmissions.

SUMMARY

The embodiments of the present disclosure provide an uplink control information transmission/configuration indication method and device, a terminal and a base station, to guarantee both robustness and high transmission efficiency at the same time during information transmissions.

An uplink control information transmission method is provided according to embodiments of the present application. The method includes:

determining a transmission configuration set corresponding to uplink control information to be sent;
selecting a transmission configuration from the transmission configuration set; and
transmitting the uplink control information to be sent according to the selected transmission configuration.

In an embodiment, the step of determining a transmission configuration set corresponding to uplink control information to be sent includes:

determining the transmission configuration set according to an information type of the uplink control information to be sent;
determining the transmission configuration set according to an indication of downlink control signaling; or
determining the transmission configuration set according to an uplink or downlink transmission mode.

In an embodiment, when the transmission configuration set includes a plurality of transmission configurations, the step of selecting a transmission configuration from the transmission configuration set includes one of:

selecting the transmission configuration from the transmission configuration set according to the information type of the uplink control information to be sent;
selecting the transmission configuration from the transmission configuration set according to the indication of the downlink control signaling; or
selecting the transmission configuration from the transmission configuration set according to the uplink or downlink transmission mode.

In an embodiment, the downlink control signaling is physical layer signaling.

In an embodiment, when the uplink control information to be sent includes response information, the step of determining a transmission configuration set corresponding to uplink control information to be sent includes: determining the transmission configuration set according to a responded object, or selecting the transmission configuration according to times of retransmission; or when the uplink control information to be sent includes channel state information (CSI), the step of determining a transmission configuration set corresponding to uplink control information to be sent includes: determining the transmission configuration set according to a type of the CSI.

In an embodiment, in determination of the transmission configuration set according to the responded object, the step of selecting a transmission configuration from the transmission configuration set includes: selecting the transmission configuration according to the responded object; or in determination of the transmission configuration set according to the type of the CSI, the step of selecting a transmission configuration from the transmission configuration set includes: selecting the transmission configuration according to the type of the CSI.

In an embodiment, the uplink control information includes at least one of: a response message, a scheduling request message, CSI, sending manner switching request information, receiving manner switching feedback information, or indication information of information reporting mode.

In an embodiment, the configuration in the transmission configuration set includes at least one of: at least one configuration of numerology, at least one configuration of sending code sequence set, at least one configuration of sending power, at least one configuration of sending times, at least one configuration of sending resource quantity, at least one configuration of sending resource granularity, at least one configuration of modulation manner, at least one configuration of coding manner, at least one configuration of sending manner, at least one configuration of receiving manner, or at least one configuration of transmission area.

In an embodiment, the configuration of numerology includes at least one of: a time domain symbol length, a subcarrier spacing, a number of points in fast Fourier transform (FFT) algorithm, a subcarrier density, a cyclic prefix (CP) length, a frequency domain guard band, or a guard period (GP); and/or the configuration of transmission area includes at least one of: a configuration of time domain transmission area or a configuration of frequency domain transmission area; and/or the configuration of coding manner includes at least one of: a code rate, a coding type, or an aggregation level; and/or the configuration of sending manner includes at least one of: a sending beam configuration, a sending antenna configuration, a sending sector configuration, or a configuration of transmission technology or mode; and/or the configuration of receiving manner includes at least one of: a receiving beam configuration, a receiving antenna configuration, or a receiving sector configuration.

According to another aspect of the embodiments of the present application, an uplink control information transmission method is further provided. The method includes:

determining a candidate transmission area set corresponding to uplink control information to be set, where the candidate transmission area set at least includes a number M of transmission areas, and M is an integer greater than 1;
selecting a number N of transmission areas from the candidate transmission area set, where N is greater than or equal to 1 and is less than or equal to M, and N is an integer; and
transmitting the uplink control information to be sent according to the N selected transmission areas.

In an embodiment, the M transmission areas at least include an area i and an area j, for transmission in the area i and the area j, a sending power offset P exists between the area i and the area j, where the sending power offset P is configured by a base station; and/or for the transmission in the area i and the area j, a sending beam used for the area i is a subset of a sending beam used for the area j; and/or for the transmission in the area i and the area j, a sending antenna used for the area i is a subset of a sending antenna used for the area j; and/or for the transmission in the area i and the area j, a sending sector used for the area i is a subset of a sending sector used for the area j; and/or for the transmission in the area i and the area j, a receiving beam used for the area i is a subset of a receiving beam used for the area j; and/or for the transmission in the area i and the area j, a receiving antenna used for the area i is a subset of a receiving antenna used for the area j; and/or for the transmission in the area i and the area j, a receiving sector used for the area i is a subset of a receiving sector used for the area j; and/or for the transmission in the area i and the area j, a length of a cyclic prefix (CP) of an orthogonal frequency division multiplexing (OFDM) symbol used for the area i is less than a length of a CP of an OFDM symbol used for the area j; and/or for the transmission in the area i and the area j, a length of a subcarrier spacing used for the area i is less than a length of a subcarrier spacing used for the area j; and/or for the transmission in the area i and the area j, a bandwidth of the area i is less than a bandwidth of the area j; and/or for the transmission in the area i and the area j, a number of OFDM symbols of the area i is less than a number of OFDM symbols of the area j; and/or a time domain symbol corresponding to the area i is a subset of a time domain symbol corresponding to the area j; and/or a resource block occupied by the area i is a subset of a resource block occupied by the area j; and/or the area i and the area j use different numerology parameters; and/or the M transmission areas correspond to M subframe sets configured by the base station; and/or the M transmission areas correspond to M resource block sets configured by the base station.

In an embodiment, the different numerology parameters include at least one of: different time domain symbol lengths, different subcarrier spacings, different subcarrier densities, different CP lengths, different frequency domain guard bands, or different guard periods (GPs).

In an embodiment, the uplink control information includes at least one of: a response message, a scheduling request message, CSI, sending manner switching request information, receiving manner switching feedback information, or indication information of information reporting mode.

According to another aspect of the embodiments of the present application, an uplink control information transmission method is further provided. The method includes:

determining a group to which uplink control information to be sent belongs according to at least one group into which uplink control information is divided in advance, where each of the at least one group of uplink control information corresponds to a respective transmission configuration set, and the transmission configuration set includes at least one transmission configuration;

selecting the transmission configuration from the transmission configuration set corresponding to the group to which the uplink control information to be sent belongs; and transmitting the uplink control information to be sent according to the selected transmission configuration.

In an embodiment, the method further includes: dividing the information into a number X of groups according to a type of the uplink control information, where X is an integer greater than or equal to 1.

In an embodiment, the uplink control information includes at least one of: a response message, a scheduling request message, CSI, sending manner switching request information, receiving manner switching feedback information, or indication information of information reporting mode.

In an embodiment, the CSI at least includes: a channel quality indicator/index (CQI), a precoding matrix indicator (PMI), a rank indicator (RI) of a channel, a channel state information reference signal resource indicator/index (CRI), port selection information, and a beam indicator/index (BI).

In an embodiment, the method further includes: dividing the uplink control information into two groups.

A first group of the two group includes at least one of: a scheduling request message, a response message, a beam indicator/index (BI), a channel state information reference signal resource indicator/index (CRI), a rank indicator (RI), sending manner switching request information, receiving manner switching feedback information, or indication information of information reporting mode, and a second group includes at least one of: a channel quality indicator/index (CQI) or a precoding matrix indicator (PMI); or the first group includes at least one of: the scheduling request message, the response message, the BI, the CRI, the RI, the sending manner switching request information, the receiving manner switching feedback information, the indication information of information reporting mode or a first PMI, and the second group includes at least one of: the CQI or a second PMI; or the first group includes at least one of: the scheduling request message, the response message, the sending manner switching request information, the receiving manner switching feedback information, or the indication information of information reporting mode, and the second group includes at least one of the second group comprises at least one of: the CQI, the PMI, the RI, the CRI, the port election information or the BI included in the CSI; or the first group includes at least one of: the scheduling request message, the sending manner switching request information, the receiving manner switching feedback information, or the indication information of information reporting mode, and the second group includes at least one of: the response information or at least one of the second group comprises at least one of: the CQI, the PMI, the RI, the CRI, the port election information or the BI included in the CSI.

In an embodiment, sending power corresponding to the second group is less than or equal to sending power corresponding to the first group; and/or a number of sending sectors corresponding to the second group is less than or equal to a number of sending sectors corresponding to the first group; and/or a number of sending antennas corresponding to the second group is less than or equal to a number of sending antennas corresponding to the first group; and/or a number of sending beams corresponding to the second group is less than or equal to a number of sending beams corresponding to the first group; and/or a sending bandwidth of the second group is less than or equal to a sending bandwidth of the first group; and/or a number of sending symbols corresponding to the second group is less than or equal to the number of sending symbols corresponding to the first group; and/or a sending resource block of the second group is less than or equal to a sending resource block of the first group; and/or a candidate transmission technology set of the second group is a subset of a candidate transmission technology set of the first group.

In an embodiment, the sending sector of the second group is a subset of the sending sector of the first group; and/or the sending antenna of the second group is a subset of the sending antenna of the first group; and/or the sending beam of the second group is a subset of the sending beam of the first group; and/or a sending symbol set of the second group is a subset of a sending symbol set of the first group; and/or a sending resource block set of the second group is a subset of a sending resource block set of the first group.

According to another aspect of the embodiments of the present application, an uplink control information transmission configuration indication method is further provided. The method includes:

determining a transmission configuration of uplink control information to be sent; and sending downlink control information at a physical layer, where the downlink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

In an embodiment, the configuration of numerology includes at least one of: a time domain symbol length, a subcarrier spacing, a number of points in fast Fourier transform (FFT) algorithm, a subcarrier density, a cyclic prefix (CP) length, a frequency domain guard band, or a guard period (GP); and/or the configuration of transmission area includes at least one of: a configuration of time domain transmission area or a configuration of frequency domain transmission area;

the configuration of coding manner includes at least one of: a code rate, a coding type, or an aggregation level; and/or the configuration of sending manner includes at least one of: a sending beam configuration, a sending antenna configuration, a sending sector configuration, or a configuration of transmission technology or mode;

the configuration of receiving manner includes at least one of: a receiving beam configuration, a receiving antenna configuration, or a receiving sector configuration.

In an embodiment, the uplink control information includes at least one of: a response message, a scheduling request message, CSI, sending manner switching request information, receiving manner switching feedback information, or indication information of information reporting mode.

According to another aspect of the embodiments of the present application, an uplink control information transmission configuration indication method is further provided. The method includes:

determining a transmission configuration of uplink control information to be sent; and sending the uplink control information, where the uplink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

In an embodiment, the configuration of numerology includes at least one of: a time domain symbol length, a subcarrier spacing, a number of points in fast Fourier transform (FFT) algorithm, a subcarrier density, a cyclic prefix (CP) length, a frequency domain guard band, or a guard period (GP); and/or the configuration of transmission area includes at least one of: a configuration of time domain transmission area or a configuration of frequency domain transmission area;

the configuration of coding manner includes at least one of: a code rate, a coding type, or an aggregation level; and/or the configuration of sending manner includes at least one of: a sending beam configuration, a sending antenna configuration, a sending sector configuration, or a configuration of transmission technology or mode; and/or the configuration of receiving manner includes at least one of: a receiving beam configuration, a receiving antenna configuration, or a receiving sector configuration.

In an embodiment, the uplink control information includes at least one of: a response message, a scheduling request message, CSI, sending manner switching request information, receiving manner switching feedback information, or indication information of information reporting mode.

According to another aspect of the embodiments of the present application, an uplink control information transmission device is further provided. The device includes:

a first determining module, which is configured to determine a transmission configuration set corresponding to uplink control information to be sent;

a first selecting module, which is configured to select a transmission configuration from the transmission configuration set; and a first transmitting module, which is configured to transmit the uplink control information to be sent according to the selected transmission configuration.

In an embodiment, the first determining module includes a first determining unit.

The first determining unit is configured to: determine the transmission configuration set according to an information type of the uplink control information to be sent; determine the transmission configuration set according to an indication of downlink control signaling; or determine the transmission configuration set according to an uplink or downlink transmission mode.

In an embodiment, the first determining unit is further configured to: when the transmission configuration set includes a plurality of transmission configurations, select the transmission configuration from the transmission configuration set according to the information type of the uplink control information to be sent; select the transmission configuration from the transmission configuration set according to the indication of the downlink control signaling; or select the transmission configuration from the transmission configuration set according to the uplink or downlink transmission mode.

In an embodiment, the first determining module includes a second determining unit.

The second determining unit is configured to, when the uplink control information to be sent includes response information, determine the transmission configuration set according to a responded object, or select the transmission configuration according to times of retransmission; or when the uplink control information to be sent includes channel state information (CSI), determine the transmission configuration set according to a type of the CSI.

In an embodiment, the first selecting module is further configured to: in determination of the transmission configuration set according to the responded object, select the transmission configuration according to the responded object, or select the transmission configuration according to times of retransmission; or in determination of the transmission configuration set according to the type of the CSI, the selecting a transmission configuration from the transmission configuration set includes: selecting the transmission configuration according to the type of the CSI.

According to another aspect of the embodiments of the present application, an uplink control information transmission device is further provided. The device includes:

a second determining module, which is configured to determine a candidate transmission area set corresponding to uplink control information to be set, where the candidate transmission area set at least includes a number M of transmission areas, and M is an integer greater than 1;

a second selecting module, which is configured to select a number N of transmission areas from the candidate transmission area set, where N is greater than or equal to 1 and is less than or equal to M, and N is an integer; and a second transmitting module, which is configured to transmit the uplink control information to be sent according to the N selected transmission configuration.

In an embodiment, the M transmission areas at least include an area i and an area j, for transmission in the area i and the area j, a sending power offset P exists between the area i and the area j, where the sending power offset P is configured by a base station; and/or for the transmission in the area i and the area j, a sending beam used for the area i is a subset of a sending beam used for the area j; and/or for the transmission in the area i and the area j, a sending antenna used for the area i is a subset of a sending antenna used for the area j; and/or for the transmission in the area i and the area j, a sending sector used for the area i is a subset of a sending sector used for the area j; and/or for the transmission in the area i and the area j, a receiving beam used for the area i is a subset of a receiving beam used for the area j; and/or for the transmission in the area i and the area j, a receiving antenna used for the area i is a subset of a receiving antenna used for the area j; and/or for the transmission in the area i and the area j, a receiving sector used for the area i is a subset of a receiving sector used for the area j; and/or for the transmission in the area i and the area j, a length of a cyclic prefix (CP) of an orthogonal frequency division multiplexing (OFDM) symbol used for the area i is less than a length of a CP of an OFDM symbol used for the area j; and/or for the transmission in the area i and the area j, a length of a subcarrier spacing used for the area i is less than a length of a subcarrier spacing used for the area j; and/or for the transmission in the area i and the area j, a bandwidth of the area i is less than a bandwidth of the area j; and/or for the transmission in the area i and the area j, a number of OFDM symbols of the area i is less than a number of OFDM symbols of the area j; and/or a time domain symbol corresponding to the area i is a subset of a time domain symbol corresponding to the area j; and/or a resource block occupied by the area i is a subset of a resource block occupied by the area j; and/or the area i and the area j use different numerology parameters; and/or the M transmission areas correspond to M subframe sets configured by the base station; and/or the M transmission areas correspond to M resource block sets configured by the base station.

According to another aspect of the embodiments of the present application, an uplink control information transmission device is further provided. The device includes:

a third determining module, which is configured to determine a group to which uplink control information to be sent belongs according to at least one group into which uplink control information is divided in advance, where each of the at least one group of uplink control information corresponds to a respective transmission configuration set, and the transmission configuration set includes at least one transmission configuration;

a third selecting module, which is configured to select the transmission configuration from the transmission configuration set corresponding to the group to which the uplink control information to be sent belongs; and a third transmitting module, which is configured to transmit the uplink control information to be sent according to the selected transmission configuration.

In an embodiment, the device further includes a grouping module.

The grouping module is configured to divide the uplink control information into two groups.

A first group of the two group includes at least one of: a scheduling request message, a response message, a beam indicator/index (BI), a channel state information reference signal resource indicator/index (CRI), a rank indicator (RI), sending manner switching request information, receiving manner switching feedback information, or indication information of information reporting mode, and a second group includes at least one of: a channel quality indicator/index (CQI) or a precoding matrix indicator (PMI); or the first group includes at least one of: the scheduling request message, the response message, the BI, the CRI, the RI, the sending manner switching request information, the receiving manner switching feedback information, the indication information of information reporting mode or a first PMI, and the second group includes at least one of: the CQI or a second PMI; or the first group includes at least one of: the scheduling request message, the response message, the sending manner switching request information, the receiving manner switching feedback information, or the indication information of information reporting mode, and the second group includes at least one of the second group comprises at least one of: the CQI, the PMI, the RI, the CRI, the port election information or the BI included in the CSI; or the first group includes at least one of: the scheduling request message, the sending manner switching request information, the receiving manner switching feedback information, or the indication information of information reporting mode, and the second group includes at least one of: the response information or at least one of the second group comprises at least one of: the CQI, the PMI, the RI, the CRI, the port election information or the BI included in the CSI.

According to another aspect of the embodiments of the present application, an uplink control information transmission configuration indication device is further provided. The device includes:

a fourth determining module, which is configured to determine a transmission configuration of uplink control information to be sent; and a first sending module, which is configured to send downlink control information at a physical layer, where the downlink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

According to another aspect of the embodiments of the present application, an uplink control information transmission configuration indication device is further provided. The device includes:

a fifth determining module, which is configured to determine a transmission configuration of uplink control information to be sent; and a second sending module, which is configured to send uplink control information, where the uplink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

According to another aspect of the embodiments of the present application, a terminal is further provided. The terminal includes a processor and a memory storing processor-executable instructions which, when executed by the processor, execute following operations:

determining a transmission configuration set corresponding to uplink control information to be sent; selecting the transmission configuration from the transmission configuration set according to the information type of the uplink control information to be sent; and transmitting the uplink control information to be sent according to the selected transmission configuration; or determining a candidate transmission area set corresponding to uplink control information to be set, where the candidate transmission area set at least includes a number M of transmission areas, and M is an integer greater than 1; selecting a number N of transmission areas from the candidate transmission area set, where N is greater than or equal to 1 and is less than or equal to M, and N is an integer; and transmitting the uplink control information to be sent according to the N selected transmission areas; or determining a group to which uplink control information to be sent belongs according to at least one group into which uplink control information is divided in advance, where each of the at least one group of uplink control information corresponds to a respective transmission configuration set, and the transmission configuration set includes at least one transmission configuration; selecting the transmission configuration from the transmission configuration set corresponding to the group to which uplink control information to be sent belongs; and transmitting the uplink control information to be sent according to the selected transmission configuration.

In an embodiment, the processor is configured to further execute the following operations: determining the transmission configuration set according to an information type of the uplink control information to be sent; determining the transmission configuration set according to an indication of downlink control signaling; or determining the transmission configuration set according to an uplink or downlink transmission mode.

According to another aspect of the embodiments of the present application, a base station is further provided. The base station includes a processor and a memory storing processor-executable instructions which, when executed by the processor, execute following operations:

determining a transmission configuration of uplink control information to be sent; and sending downlink control information at a physical layer, where the downlink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

According to another aspect of the embodiments of the present application, a terminal is further provided. The terminal includes a processor and a memory storing processor-executable instructions which, when executed by the processor, execute following operations:

determining a transmission configuration of uplink control information to be sent; and sending the uplink control information, where the uplink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

According to yet another aspect of the embodiments of the present application, a storage medium is further provided. The storage medium is configured to store program codes for executing following steps:

determining a transmission configuration set corresponding to uplink control information to be sent; selecting the transmission configuration from the transmission configuration set according to the information type of the uplink control information to be sent; and transmitting the uplink control information to be sent according to the selected transmission configuration; or determining a candidate transmission area set corresponding to uplink control information to be set, where the candidate transmission area set at least includes a number M of transmission areas, and M is an integer greater than 1; selecting a number N of transmission areas from the candidate transmission area set, where N is greater than or equal to 1 and is less than or equal to M, and N is an integer; and transmitting the uplink control information to be sent according to the N selected transmission areas; or determining a group to which uplink control information to be sent belongs according to at least one group into which uplink control information is divided in advance, where each of the at least one group of uplink control information corresponds to a respective transmission configuration set, and the transmission configuration set includes at least one transmission configuration; selecting the transmission configuration from the transmission configuration set corresponding to the group to which uplink control information to be sent belongs; and transmitting the uplink control information to be sent according to the selected transmission configuration.

Through the embodiments of the present application, a transmission configuration set corresponding to uplink control information to be sent is determined, a transmission configuration is selected from the transmission configuration set, and the uplink control information to be sent is transmitted according to the selected transmission configuration, thereby guaranteeing both robustness and high transmission efficiency at the same time.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

The present application will be described hereinafter in detail through embodiments with reference to the drawings. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Embodiment 1

Figure 1:
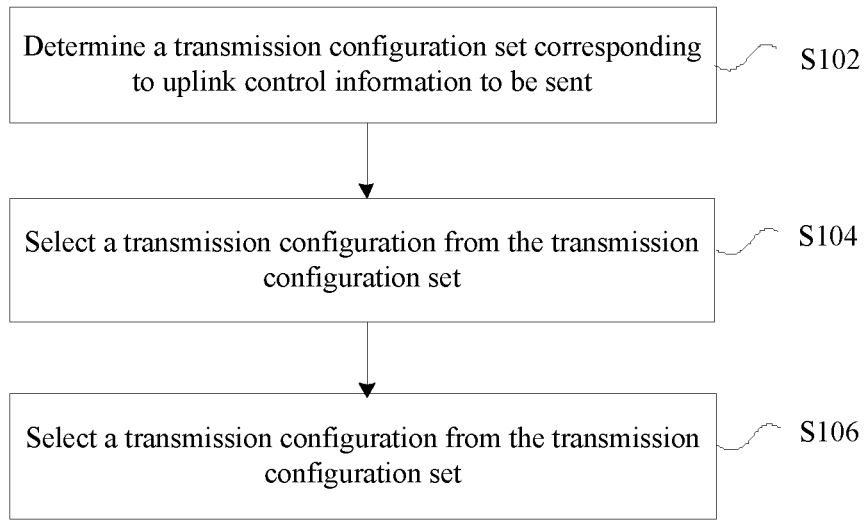
FIG. 1 is a flowchart one of an uplink control information transmission method according to an embodiment of the present application.

This embodiment provides an uplink control information transmission method. FIG. 1 is a flowchart one of an uplink control information transmission method according to an embodiment of the present application. As shown in FIG. 1, the method includes steps described below.

In step S102, a transmission configuration set corresponding to uplink control information to be sent is determined.

In step S104, a transmission configuration is selected from the transmission configuration set.

In step S106, the uplink control information to be sent is transmitted according to the selected transmission configuration.

Through the steps described above, a transmission configuration set corresponding to uplink control information to be sent is determined, a transmission configuration is selected from the transmission configuration set, and the uplink control information to be sent is transmitted according to the selected transmission configuration, thereby guaranteeing both robustness and high transmission efficiency at the same time.

In an embodiment, the step in which a transmission configuration set corresponding to uplink control information to be sent is determined includes: determining the transmission configuration set according to an information type of the uplink control information to be sent; determining the transmission configuration set according to an indication of downlink control signaling; or determining the transmission configuration set according to an uplink or downlink transmission mode.

in an embodiment, when the transmission configuration set includes a plurality of transmission configurations, the step in which a transmission configuration is selected from the transmission configuration set includes: selecting the transmission configuration from the transmission configuration set according to the information type of the uplink control information to be sent; selecting the transmission configuration from the transmission configuration set according to the indication of the downlink control signaling; or selecting the transmission configuration from the transmission configuration set according to the uplink or downlink transmission mode. The downlink control signaling is physical layer signaling.

In an embodiment, when the uplink control information to be sent includes a response message, the step in which a transmission configuration set corresponding to uplink control information to be sent is determined includes: determining the transmission configuration set according to a responded object, or selecting the transmission configuration according to times of retransmission; or when the uplink control information to be sent includes channel state information (CSI), the step in which a transmission configuration set corresponding to uplink control information to be sent is determined includes: determining the transmission configuration set according to a type of the CSI.

In an embodiment, in determination of the transmission configuration set according to the responded object, the step in which a transmission configuration is selected from the transmission configuration set includes: selecting the transmission configuration according to the responded object, or selecting the transmission configuration according to times of retransmission; or in determination of the transmission configuration set according to the type of the CSI, the step in which a transmission configuration is selected from the transmission configuration set includes: selecting the transmission configuration according to the type of the CSI.

In an embodiment, the uplink control information includes at least one of: a response message, a scheduling request message, CSI, sending manner switching request information, receiving manner switching feedback information, or indication information of information reporting mode.

In an embodiment, the configuration in the transmission configuration set includes at least one of: at least one configuration of numerology, at least one configuration of sending code sequence set, at least one configuration of sending power, at least one configuration of sending times, at least one configuration of sending resource quantity, at least one configuration of sending resource granularity, at least one configuration of modulation manner, at least one configuration of coding manner, at least one configuration of sending manner, at least one configuration of receiving manner, or at least one configuration of transmission area.

In an embodiment, the configuration of numerology includes at least one of: a time domain symbol length, a subcarrier spacing, a number of points in fast Fourier transform (FFT) algorithm, a subcarrier density, a cyclic prefix (CP) length, a frequency domain guard band, or a guard period (GP); and/or the configuration of transmission area includes at least one of: a configuration of time domain transmission area or a configuration of frequency domain transmission area; and/or the configuration of coding manner includes at least one of: a code rate, a coding type, or an aggregation level; and/or the configuration of sending manner includes at least one of: a sending beam configuration, a sending antenna configuration, a sending sector configuration, or a configuration of transmission technology or mode; and/or the configuration of receiving manner includes at least one of: a receiving beam configuration, a receiving antenna configuration, or a receiving sector configuration.

Figure 2:
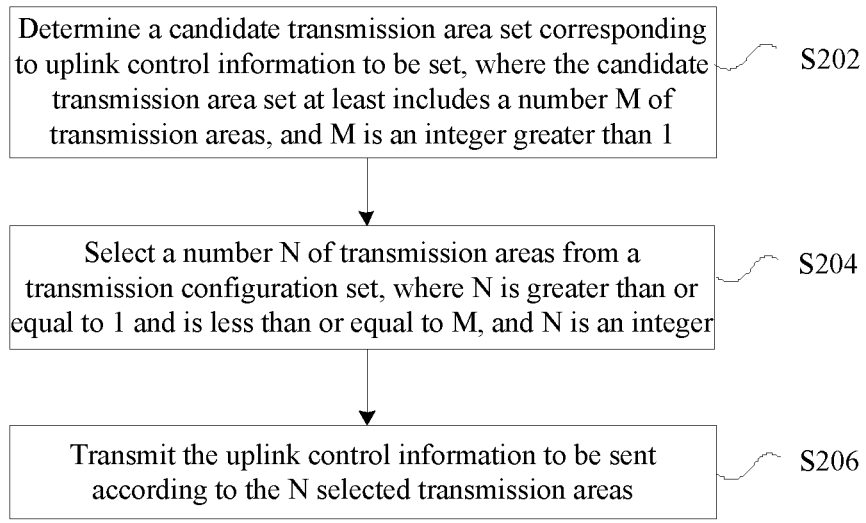
FIG. 2 is a flowchart two of an uplink control information transmission method according to an embodiment of the present application.

This embodiment further provides an uplink control information transmission method. FIG. 2 is a flowchart two of an uplink control information transmission method according to an embodiment of the present application. As shown in FIG. 2, the method includes steps described below.

In step S202, a candidate transmission area set corresponding to uplink control information to be set is determined, where the candidate transmission area set at least includes a number M of transmission areas, and M is an integer greater than 1.

In step S204, a number N of transmission areas are selected from the candidate transmission area set, where N is greater than or equal to 1 and is less than or equal to M, and N is an integer.

In step S206, the uplink control information to be sent is transmitted according to the N selected transmission areas.

Through the steps described above, a candidate transmission area set corresponding to uplink control information to be set is determined, where the candidate transmission area set at least includes a number M of transmission areas, and M is an integer greater than 1; a number N of transmission areas are selected from the candidate transmission area set, where N is greater than or equal to 1 and is less than or equal to M, and N is an integer; and the uplink control information to be sent is transmitted according to the N selected transmission areas, thereby guaranteeing both robustness and high transmission efficiency at the same time.

In an embodiment, the M transmission areas at least include an area i and an area j, for transmission in the area i and the area j, a sending power offset P exists between the area i and the area j, where the sending power offset P is configured by a base station; and/or for the transmission in the area i and the area j, a sending beam used for the area i is a subset of a sending beam used for the area j; and/or for the transmission in the area i and the area j, a sending antenna used for the area i is a subset of a sending antenna used for the area j; and/or for the transmission in the area i and the area j, a sending sector used for the area i is a subset of a sending sector used for the area j; and/or for the transmission in the area i and the area j, a receiving beam used for the area i is a subset of a receiving beam used for the area j; and/or for the transmission in the area i and the area j, a receiving antenna used for the area i is a subset of a receiving antenna used for the area j; and/or for the transmission in the area i and the area j, a receiving sector used for the area i is a subset of a receiving sector used for the area j; and/or for the transmission in the area i and the area j, a length of a cyclic prefix (CP) of an orthogonal frequency division multiplexing (OFDM) symbol used for the area i is less than a length of a CP of an OFDM symbol used for the area j; and/or for the transmission in the area i and the area j, a length of a subcarrier spacing used for the area i is less than a length of a subcarrier spacing used for the area j; and/or for the transmission in the area i and the area j, a bandwidth of the area i is less than a bandwidth of the area j; and/or for the transmission in the area i and the area j, a number of OFDM symbols of the area i is less than a number of OFDM symbols of the area j; and/or a time domain symbol corresponding to the area i is a subset of a time domain symbol corresponding to the area j; and/or a resource block occupied by the area i is a subset of a resource block occupied by the area j; and/or the area i and the area j use different numerology parameters; and/or the M transmission areas correspond to M subframe sets configured by the base station; and/or the M transmission areas correspond to M resource block sets configured by the base station.

In an embodiment, the different numerology parameters include at least one of: different time domain symbol lengths, different subcarrier spacings, different subcarrier densities, different CP lengths, different frequency domain guard bands, or different guard periods (GPs).

In an embodiment, the uplink control information includes at least one of: a response message, a scheduling request message, channel state information (CSI), sending manner switching request information, receiving manner switching feedback information, or indication information of information reporting mode.

Figure 3:
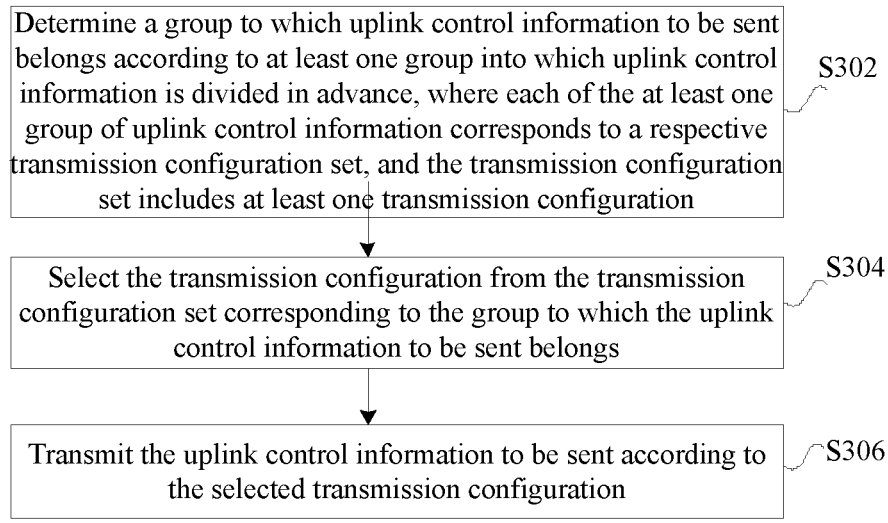
FIG. 3 is a flowchart three of an uplink control information transmission method according to an embodiment of the present application.

This embodiment further provides an uplink control information transmission method. FIG. 3 is a flowchart three of an uplink control information transmission method according to an embodiment of the present application. As shown in FIG. 3, the method includes steps described below.

In step S302, a group to which uplink control information to be sent belongs is determined according to at least one group into which uplink control information is divided in advance, where each of the at least one group of uplink control information corresponds to a respective transmission configuration set, and the transmission configuration set includes at least one transmission configuration.

In step S304, the transmission configuration is selected from the transmission configuration set corresponding to the group to which the uplink control information to be sent belongs.

In step S306, the uplink control information to be sent is transmitted according to the selected transmission configuration.

Through the steps described below, a group to which uplink control information to be sent belongs is determined according to at least one group into which uplink control information is divided in advance, where each of the at least one group of uplink control information corresponds to a respective transmission configuration set, and the transmission configuration set includes at least one transmission configuration; the transmission configuration is selected from the transmission configuration set corresponding to the group to which uplink control information to be sent belongs; and the uplink control information to be sent is transmitted according to the selected transmission configuration, thereby guaranteeing both robustness and high transmission efficiency at the same time.

In an embodiment, the method further includes: dividing the information into a number X of groups according to a type of the uplink control information, where X is an integer greater than or equal to 1.

In an embodiment, the uplink control information includes at least one of: a response message, a scheduling request message, channel state information (CSI), sending manner switching request information, receiving manner switching feedback information, or indication information of information reporting mode.

In an embodiment, the CSI at least includes: a channel quality indicator/index (CQI), a precoding matrix indicator (PMI), a rank indicator (RI) of a channel, a channel state information reference signal resource indicator/index (CRI), port selection information, and a beam indicator/index (BI).

In an embodiment, when X is 2, the uplink control information is divided into two groups.

The first group of the two group includes at least one of: the scheduling request message, the response message, the BI, the CRI, the RI, the sending manner switching request information, the receiving manner switching feedback information, or the indication information of information reporting mode, and a second group includes at least one of: the CQI or the PMI; or the first group of the two group includes at least one of: the scheduling request message, the BI, the CRI, the RI, the sending manner switching request information, the receiving manner switching feedback information, or the indication information of information reporting mode, and a second group includes at least one of: the CQI or a second PMI; or the first group includes at least one of: the scheduling request message, the response message, the sending manner switching request information, the receiving manner switching feedback information, or the indication information of information reporting mode, and the second group includes at least one of pieces of information included in the CSI; or the first group includes at least one of: the scheduling request message, the sending manner switching request information, the receiving manner switching feedback information, or the indication information of information reporting mode, and the second group includes at least one of: the response information or at least one of pieces of information included in the CSI.

In an embodiment, sending power corresponding to the second group is less than or equal to sending power corresponding to the first group; and/or a number of sending sectors corresponding to the second group is less than or equal to a number of sending sectors corresponding to the first group; and/or a number of sending antennas corresponding to the second group is less than or equal to a number of sending antennas corresponding to the first group; and/or a number of sending beams corresponding to the second group is less than or equal to a number of sending beams corresponding to the first group; and/or a sending bandwidth of the second group is less than or equal to a sending bandwidth of the first group; and/or a number of sending symbols corresponding to the second group is less than or equal to the number of sending symbols corresponding to the first group; and/or a sending resource block of the second group is less than or equal to a sending resource block of the first group; and/or a candidate transmission technology set of the second group is a subset of a candidate transmission technology set of the first group.

In an embodiment, the sending sector of the second group is a subset of the sending sector of the first group; and/or the sending antenna of the second group is a subset of the sending antenna of the first group; and/or the sending beam of the second group is a subset of the sending beam of the first group; and/or a sending symbol set of the second group is a subset of a sending symbol set of the first group; and/or a sending resource block set of the second group is a subset of a sending resource block set of the first group.

Figure 4:
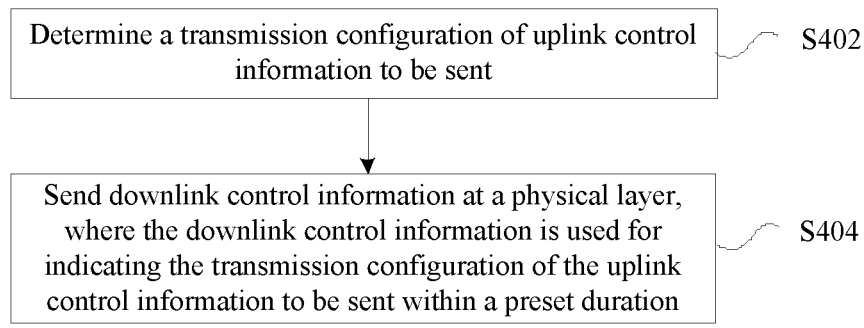
FIG. 4 is a flowchart one of an uplink control information transmission configuration indication method according to an embodiment of the present application.

This embodiment further provides an uplink control information transmission configuration indication method. FIG. 4 is a flowchart one of an uplink control information transmission configuration indication method according to an embodiment of the present application. As shown in FIG. 4, the method includes steps described below.

In step S402, a transmission configuration of uplink control information to be sent is determined.

In step S404, downlink control information is sent at a physical layer, where the downlink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

In an embodiment, the configuration of numerology includes at least one of: a time domain symbol length, a subcarrier spacing, a number of points in fast Fourier transform (FFT) algorithm, a subcarrier density, a cyclic prefix (CP) length, a frequency domain guard band, or a guard period (GP); and/or the configuration of transmission area includes at least one of: a configuration of time domain transmission area or a configuration of frequency domain transmission area; and/or the configuration of coding manner includes at least one of: a code rate, a coding type, or an aggregation level; and/or the configuration of sending manner includes at least one of: a sending beam configuration, a sending antenna configuration, a sending sector configuration, or a configuration of transmission technology or mode; and/or the configuration of receiving manner includes at least one of: a receiving beam configuration, a receiving antenna configuration, or a receiving sector configuration.

In an embodiment, the uplink control information includes at least one of: a response message, a scheduling request message, channel state information (CSI), sending manner switching request information, receiving manner switching feedback information, or indication information of information reporting mode.

Figure 5:
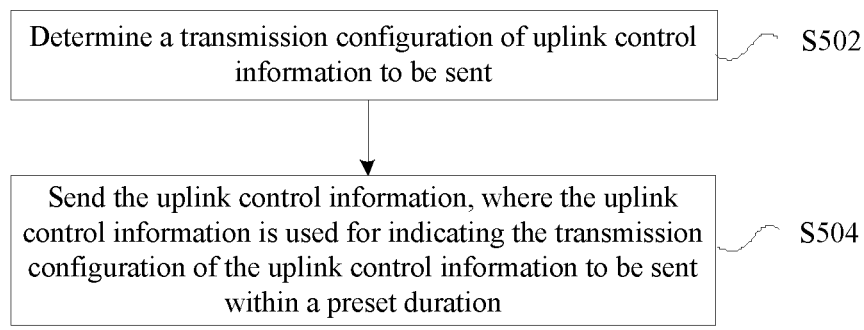
FIG. 5 is a flowchart two of an uplink control information transmission configuration indication method according to an embodiment of the present application.

This embodiment further provides an uplink control information transmission configuration indication method. FIG. 5 is a flowchart two of an uplink control information transmission configuration indication method according to an embodiment of the present application. As shown in FIG. 5, the method includes steps described below.

In step S502, a transmission configuration of uplink control information to be sent is determined.

In step S504, the uplink control information is sent, where the uplink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

In an embodiment, the configuration of numerology includes at least one of: a time domain symbol length, a subcarrier spacing, a number of points in fast Fourier transform (FFT) algorithm, a subcarrier density, a cyclic prefix (CP) length, a frequency domain guard band, or a guard period (GP);

the configuration of transmission area includes at least one of: a configuration of time domain transmission area or a configuration of frequency domain transmission area; and/or the configuration of coding manner includes at least one of: a code rate, a coding type, or an aggregation level;

the configuration of sending manner includes at least one of: a sending beam configuration, a sending antenna configuration, a sending sector configuration, or a configuration of transmission technology or mode;

the configuration of receiving manner includes at least one of: a receiving beam configuration, a receiving antenna configuration, or a receiving sector configuration.

In an embodiment, the uplink control information includes at least one of: a response message, a scheduling request message, channel state information (CSI), sending manner switching request information, receiving manner switching feedback information, or indication information of information reporting mode.

For the uplink, a terminal needs to feed back some information unknown to a base station to the base station and some request messages initiated by the terminal, such as following types of information: the response message, the scheduling request message and the CSI.

The response message mainly includes states such as acknowledgement (ACK) and negative acknowledgement (NACK), and is used as a response to control information or a data block which has been previously sent. For the data block, in general, the ACK is fed back when the data block is received and decoded correctly; the NACK is fed back when the data block is received but decoded incorrectly; and nothing is fed back when no data block is received. For the control information, there are three situations. In the first situation, which is the same as the data block, the ACK is fed back when the control information is received and decoded correctly; and the NACK is fed back when the control information is received but decoded incorrectly. In the second situation, the ACK is fed back only when the control information is received and decoded correctly; otherwise, nothing is fed back. In the third situation, the NACK is fed back only when the control information is received but decoded incorrectly; otherwise, nothing is fed back.

The scheduling request message is mainly used for UE to initiate a scheduling request to the base station.

The CSI is a general term and includes various types of CSI, such as quantization information of a matrix of a channel, quantization information of feature vectors of the channel, a channel quality indicator/index (CQI), interference measurement, a precoding matrix indicator (PMI), a rank indicator (RI) of the channel, feedback information of the number of precoding layers, a channel state information reference signal resource indicator/index (CRI), port selection information, indication information of a measurement resource location, and a beam indicator/index (BI).

Besides some traditional reported control information, the present application further considers some new report information for improving the robustness and performance during the transmission. The new report information mainly includes the sending manner switching request information, receiving manner switching feedback information, and the indication information of information reporting mode described below.

The sending manner switching request information is mainly used by the terminal to request the base station to switch the sending manner, and the sending manner includes a sending node, a sending beam, a transmission technology, a sending antenna, a sending sector, etc.

The receiving manner switching feedback information is mainly used by the terminal to notify the base station to switch the receiving manner, and the receiving manner includes a receiving beam, a receiving antenna, a receiving sector, etc.

The indication information of information reporting mode is mainly used for indicating subsequent information reporting content.

Subsequent embodiments mainly describe how to use some more flexible and more efficient transmission technologies to report some of above information.

Embodiment 2

Figure 6:
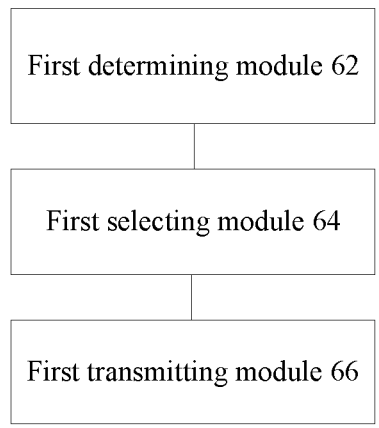
FIG. 6 is a block diagram one of an uplink control information transmission device according to an embodiment of the present application.

This embodiment provides an uplink control information transmission device. FIG. 6 is a block diagram one of an uplink control information transmission device according to an embodiment of the present application. As shown in FIG. 6, the device includes a first determining module 62, a first selecting module 64 and a first transmitting module 66.

The first determining module 62 is configured to determine a transmission configuration set corresponding to uplink control information to be sent.

The first selecting module 64 is configured to select a transmission configuration from the transmission configuration set.

The first transmitting module 66 is configured to transmit the uplink control information to be sent according to the selected transmission configuration.

Figure 7:
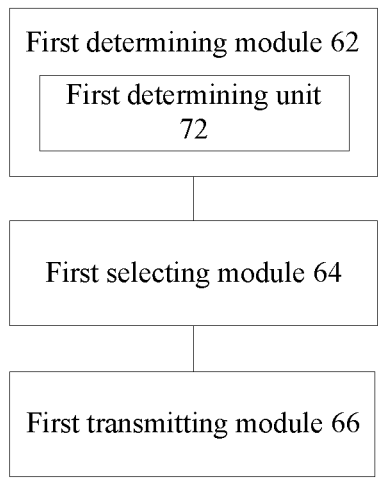
FIG. 7 is a block diagram one of an uplink control information transmission device according to a preferred embodiment of the present application.

FIG. 7 is a block diagram one of an uplink control information transmission device according to a preferred embodiment of the present application. As shown in FIG. 7, the first determining module 62 includes a first determining unit 72.

The first determining unit 72 is configured to determine the transmission configuration set according to an information type of the uplink control information to be sent; determine the transmission configuration set according to an indication of downlink control signaling; or determine the transmission configuration set according to an uplink or downlink transmission mode.

In an embodiment, the first determining unit 64 is further configured to, when the transmission configuration set includes a plurality of transmission configurations, select the transmission configuration from the transmission configuration set according to the information type of the uplink control information to be sent; select the transmission configuration from the transmission configuration set according to the indication of the downlink control signaling; or select the transmission configuration from the transmission configuration set according to the uplink or downlink transmission mode.

Figure 8:
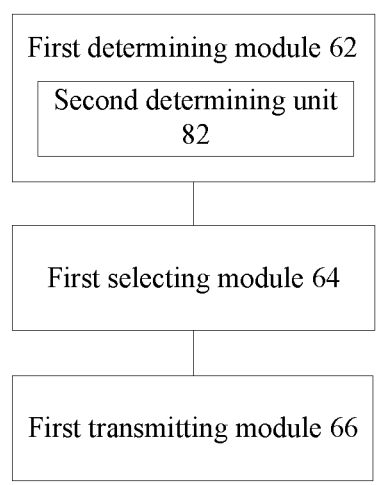
FIG. 8 is a block diagram two of an uplink control information transmission device according to a preferred embodiment of the present application.

FIG. 8 is a block diagram two of an uplink control information transmission device according to a preferred embodiment of the present application. As shown in FIG. 8, the first determining module 62 includes a second determining unit 82.

The second determining unit 82 is configured to, when the uplink control information to be sent comprises response information, determine the transmission configuration set according to a responded object, or select the transmission configuration according to times of retransmission; or
    when the uplink control information to be sent comprises channel state information (CSI), determine the transmission configuration set according to a type of the CSI.

In an embodiment, the first selecting module 64 is further configured to, in determination of the transmission configuration set according to the responded object, select the transmission configuration according to the responded object; or in determination of the transmission configuration set according to the type of the CSI, select the transmission configuration according to the type of the CSI.

Figure 9:
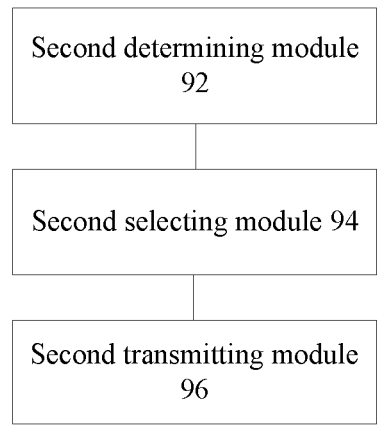
FIG. 9 is a block diagram two of an uplink control information transmission device according to an embodiment of the present application.

This embodiment provides an uplink control information transmission device. FIG. 9 is a block diagram two of an uplink control information transmission device according to an embodiment of the present application. As shown in FIG. 9, the device includes a second determining module 92, a second selecting module 94 and a second transmitting module 96.

The second determining module 92 is configured to determine a candidate transmission area set corresponding to uplink control information to be set, where the candidate transmission area set at least includes a number M of transmission areas, and M is an integer greater than 1.

The second selecting module 94 is configured to select a number N of transmission areas from the candidate transmission area set, where N is greater than or equal to 1 and is less than or equal to M, and N is an integer.

The second transmitting module 96 is configured to transmit the uplink control information to be sent according to the N selected transmission configuration.

In an embodiment, the M transmission areas at least include an area i and an area j,
    for transmission in the area i and the area j, a sending power offset P exists between the area i and the area j, where the sending power offset P is configured by a base station; and/or
    for the transmission in the area i and the area j, a sending beam used for the area i is a subset of a sending beam used for the area j; and/or
    for the transmission in the area i and the area j, a sending antenna used for the area i is a subset of a sending antenna used for the area j; and/or for the transmission in the area i and the area j, a sending sector used for the area i is a subset of a sending sector used for the area j; and/or for the transmission in the area i and the area j, a receiving beam used for the area i is a subset of a receiving beam used for the area j; and/or for the transmission in the area i and the area j, a receiving antenna used for the area i is a subset of a receiving antenna used for the area j; and/or for the transmission in the area i and the area j, a receiving sector used for the area i is a subset of a receiving sector used for the area j; and/or for the transmission in the area i and the area j, a length of a cyclic prefix (CP) of an orthogonal frequency division multiplexing (OFDM) symbol used for the area i is less than a length of a CP of an OFDM symbol used for the area j; and/or for the transmission in the area i and the area j, a length of a subcarrier spacing used for the area i is less than a length of a subcarrier spacing used for the area j; and/or for the transmission in the area i and the area j, a bandwidth of the area i is less than a bandwidth of the area j; and/or for the transmission in the area i and the area j, a number of OFDM symbols of the area i is less than a number of OFDM symbols of the area j; and/or a time domain symbol corresponding to the area i is a subset of a time domain symbol corresponding to the area j; and/or a resource block occupied by the area i is a subset of a resource block occupied by the area j; and/or the area i and the area j use different numerology parameters; and/or the M transmission areas correspond to M subframe sets configured by the base station; and/or the M transmission areas correspond to M resource block sets configured by the base station.

Figure 10:
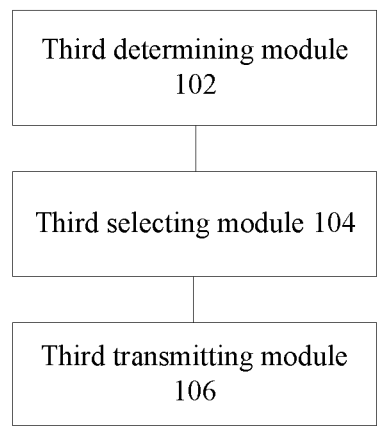
FIG. 10 is a block diagram three of an uplink control information transmission device according to an embodiment of the present application.

This embodiment further provides an uplink control information transmission device. FIG. 10 is a block diagram three of an uplink control information transmission device according to an embodiment of the present application. As shown in FIG. 10, the device includes a third determining module 102, a third selecting module 104 and a third transmitting module 106.

The third determining module 102 is configured to determine a group to which uplink control information to be sent belongs according to at least one group into which uplink control information is divided in advance, where each of the at least one group of uplink control information corresponds to a respective transmission configuration set, and the transmission configuration set includes at least one transmission configuration.

The third selecting module 104 is configured to select the transmission configuration from the transmission configuration set corresponding to the group to which the uplink control information to be sent belongs.

The third transmitting module 106 is configured to transmit the uplink control information to be sent according to the selected transmission configuration.

Figure 11:
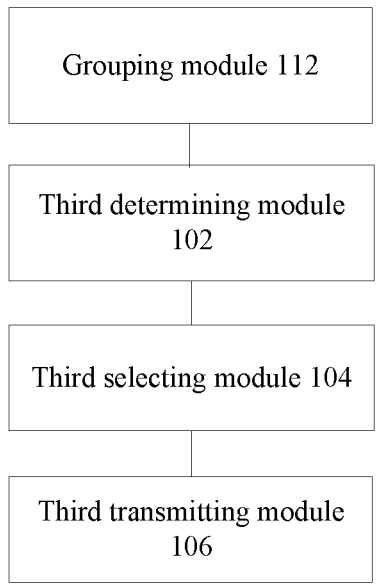
FIG. 11 is a block diagram three of an uplink control information transmission device according to a preferred embodiment of the present application.

FIG. 11 is a block diagram three of an uplink control information transmission device according to a preferred embodiment of the present application. As shown in FIG. 11, the device includes a grouping unit 112.

The grouping module 112 is configured to divide the uplink control information into two groups.

A first group of the two group includes at least one of: the scheduling request message, the response message, the BI, the CRI, the RI, the sending manner switching request information, the receiving manner switching feedback information, or the indication information of information reporting mode, and a second group includes at least one of: the CQI or the PMI; or the first group of the two group includes at least one of: the scheduling request message, the BI, the CRI, the RI, the sending manner switching request information, the receiving manner switching feedback information, or the indication information of information reporting mode, and a second group includes at least one of: the CQI or a second PMI; or the first group includes at least one of: the scheduling request message, the response message, the sending manner switching request information, the receiving manner switching feedback information, or the indication information of information reporting mode, and the second group includes at least one of pieces of information included in the CSI; or the first group includes at least one of: the scheduling request message, the sending manner switching request information, the receiving manner switching feedback information, or the indication information of information reporting mode, and the second group includes at least one of: the response information or at least one of pieces of information included in the CSI.

Figure 12:
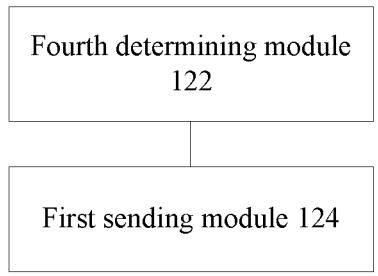
FIG. 12 is a block diagram one of an uplink control information transmission configuration indication device according to an embodiment of the present application.

This embodiment further provides an uplink control information transmission configuration indication device. FIG. 12 is a block diagram one of an uplink control information transmission configuration indication device according to an embodiment of the present application. As shown in FIG. 12, the device includes a fourth determining module 122 and a first sending module 124.

The fourth determining module 122 is configured to determine a transmission configuration of uplink control information to be sent.

The first sending module 124 is configured to send downlink control information at a physical layer, where the downlink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

Figure 13:
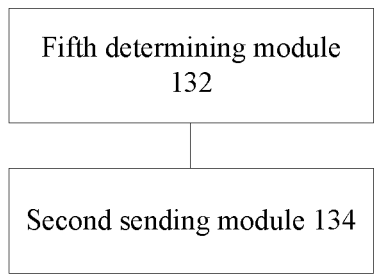
FIG. 13 is a block diagram two of an uplink control information transmission configuration indication device according to an embodiment of the present application.

This embodiment further provides an uplink control information transmission configuration indication device. FIG. 13 is a block diagram two of an uplink control information transmission configuration indication device according to an embodiment of the present application. As shown in FIG. 13, the device includes a fifth determining module 132 and a second sending module 134.

The fifth determining module 132 is configured to determine a transmission configuration of uplink control information to be sent.

The second sending module 134 is configured to send uplink control information, where the uplink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

Figure 14:
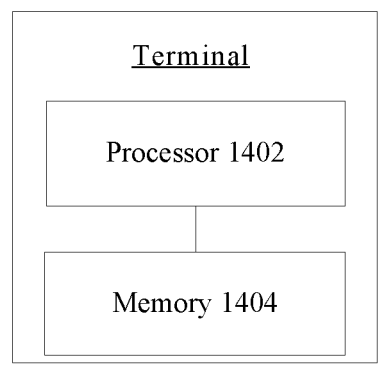
FIG. 14 is a schematic diagram of a terminal according to an embodiment of the present application.

This embodiment further provides a terminal. FIG. 14 is a schematic diagram of a terminal according to an embodiment of the present application. As shown in FIG. 14, the terminal includes a processor 1402 and a memory 1404 storing processor-executable instructions which, when executed by the processor, execute following operations:

determining a transmission configuration set corresponding to uplink control information to be sent; selecting the transmission configuration from the transmission configuration set according to the information type of the uplink control information to be sent; and transmitting the uplink control information to be sent according to the selected transmission configuration; or determining a candidate transmission area set corresponding to uplink control information to be set, where the candidate transmission area set at least includes a number M of transmission areas, and M is an integer greater than 1; selecting a number N of transmission areas from the candidate transmission area set, where N is greater than or equal to 1 and is less than or equal to M, and N is an integer; and transmitting the uplink control information to be sent according to the N selected transmission areas; or determining a group to which uplink control information to be sent belongs according to at least one group into which uplink control information is divided in advance, where each of the at least one group of uplink control information corresponds to a respective transmission configuration set, and the transmission configuration set includes at least one transmission configuration; selecting the transmission configuration from the transmission configuration set corresponding to the group to which uplink control information to be sent belongs; and transmitting the uplink control information to be sent according to the selected transmission configuration.

In an embodiment, the processor is configured to further execute the following operations: determining the transmission configuration set according to an information type of the uplink control information to be sent; determining the transmission configuration set according to an indication of downlink control signaling; or determining the transmission configuration set according to an uplink or downlink transmission mode.

Figure 15:
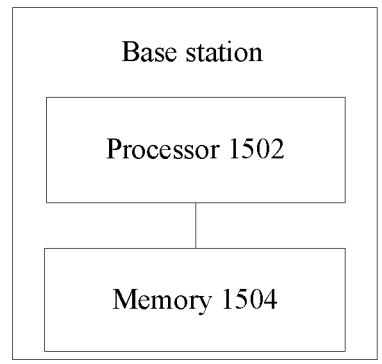
FIG. 15 is a schematic diagram of a base station according to an embodiment of the present application.

This embodiment further provides a base station. FIG. 15 is a schematic diagram of a base station according to an embodiment of the present application. As shown in FIG. 15, the base station includes a processor 1502 and a memory 1504 storing processor-executable instructions which, when executed by the processor, execute following operations:

determining a transmission configuration of uplink control information to be sent; and sending downlink control information at a physical layer, where the downlink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

This embodiment further provides a terminal, which includes a processor and a memory storing processor-executable instructions which, when executed by the processor, execute following operations:

determining a transmission configuration of uplink control information to be sent; and sending the uplink control information, where the uplink control information is used for indicating the transmission configuration of the uplink control information to be sent within a preset duration.

In an embodiment, the transmission configuration includes at least one of: a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

Embodiment 3

This embodiment further provides a storage medium. Optionally, in this embodiment, the storage medium may be configured to store program codes for executing steps described below.

In step S11, a transmission configuration set corresponding to uplink control information to be sent is determined.

In step S12, a transmission configuration is selected from the transmission configuration set.

In step S13, the uplink control information to be sent is transmitted according to the selected transmission configuration.

Alternatively, the storage medium may be configured to store program codes for executing steps described below.

In step S21, a candidate transmission area set corresponding to uplink control information to be set is determined, where the candidate transmission area set at least includes a number M of transmission areas, and M is an integer greater than 1.

In step S22, N transmission areas is selected from the candidate transmission area set, where N is greater than or equal to 1 and is less than or equal to M, and N is an integer.

In step S23, the uplink control information to be sent is transmitted according to the N selected transmission areas.

Alternatively, the storage medium may be configured to store program codes for executing steps described below.

In step S31, a group to which uplink control information to be sent belongs is determined according to at least one group into which uplink control information is divided in advance, where each of the at least one group of uplink control information corresponds to a respective transmission configuration set, and the transmission configuration set includes at least one transmission configuration.

In step S32, the transmission configuration is selected from the transmission configuration set corresponding to the group to which the uplink control information to be sent belongs.

In step S33, the uplink control information to be sent is transmitted according to the selected transmission configuration.

Optionally, in this embodiment, the storage medium described above may include, but is not limited to, a USB flash disk, a read-only memory (ROM), a random access memory (RAM), a mobile hard disk, a magnetic disk, an optical disk or another medium capable of storing program codes.

Optionally, for specific examples in the embodiment, reference may be made to the examples described in the above-mentioned embodiments and optional embodiments, and repetition will not be made herein.

Embodiment 4

In step 101, a first type of information is determined. The first type of information includes: a response message, a scheduling request message, channel state information (CSI), sending manner switching request information, receiving manner switching feedback information, and indication information of information reporting mode, which are mentioned above.

At each time instant, the terminal needs to determine the content of information which needs to be reported according to a current feedback mode, trigger signaling of the base station, and agreement between the terminal and the base station. At the same time instant, there may be only one type of the first type of information which needs to be reported, or there may be multiple types of the first type of information which need to be reported. When multiple types of the first type of information need to be reported, these types of the first type of information may be combined and reported, or may be reported separately.

In step 102, a transmission configuration set corresponding to the first type of information is determined.

The first type of information may correspond to different transmission configuration sets. The transmission configuration in the transmission configuration set is used for transmitting the first type of information. Specific parameter types included in the transmission configuration will be described in the embodiments hereafter.

There are several manners for determining the transmission configuration set corresponding to the first type of information. Among them, one manner is to achieve an agreement on the transmission configuration set corresponding to the first type of information in advance; and another manner is to require configuration signaling of the base station to configure the transmission configuration set. If the base station has sent configuration set indication signaling, the terminal needs to determine the transmission configuration set according to the configuration set indication signaling. Different terminals may configure different transmission configuration sets. Since different uplink or downlink transmission modes may correspond to different agreements or configurations of the transmission configuration set, regardless of the manner of agreement in advance or the manner requiring the indication of the signaling of the base station, the terminal needs to determine the transmission configuration set in conjunction with the uplink or downlink transmission mode. Since information types included in different first type of information may correspond to agreements or configurations of different transmission configuration sets, regardless of the manner of agreement in advance or the manner requiring the indication of the signaling of the base station, the terminal needs to determine the transmission configuration set in conjunction with the information type included in the first type of information.

It is to be noted that when the first type of information is the response message, response messages directed to different responded objects should be considered as different types. For example, the response message for data and the response message for control may correspond to different transmission configuration sets.

It is to be noted that when the first type of information is the CSI, different sub-types of the CSI should be considered as different types. For example, the CRI, the RI, the PMI and the CQI may correspond to different transmission configuration sets.

For the response message, the transmission configuration set for the case where the responded object is first transmitted data may be different from the transmission configuration set for the case where the responded object is retransmitted data. Therefore, regardless of the manner of agreement in advance or the manner requiring the indication of the signaling of the base station, the terminal needs to determine the transmission configuration set in conjunction of whether the data, to which the response message is responsive, is first transmitted or retransmitted, as well as how many times the data has been retransmitted.

The better different transmission configuration sets may be different, so that different sets may be determined in advance according to features of various types of the first type of information. In general, extreme importance and information of low sending frequency may take a transmission configuration with high robustness; and information of ordinary importance may take a transmission configuration with relatively high robustness and a transmission configuration with relatively high transmission efficiency. It is to be noted that higher the robustness is, more resources are required for transmitting information. The resources include time domain resources, frequency domain resources, spatial domain resources, a code domain resources and power. The high transmission efficiency means that the information is transmitted successfully by using fewer resources.

In step 103, a transmission configuration is selected from the transmission configuration set.

If the base station has sent configuration selection indication signaling, the terminal needs to select the transmission configuration in the transmission configuration set according to the configuration selection indication signaling. The signaling may be physical layer control signaling, which allows to quickly switch between configurations and to flexibly select the transmission configuration in the transmission configuration set. There is another situation where there is no indication signaling. In this situation, the terminal may autonomously and flexibly select the transmission configuration. Different terminals may select different transmission configurations in the transmission configuration set. Alternatively, the terminal may select the transmission configuration according to the transmission mode, the information type included in the first type of information, the responded object and retransmission times of response information. Different transmission configurations in the transmission configuration set may be selected for different uplink or downlink transmission modes. Different transmission configurations in the transmission configuration set may be selected for different information types included in the first type of information.

It is to be noted that when the first type of information is the response message, response messages directed to different responded objects should be considered as different types. For example, the response message for data and the response message for the control may correspond to different transmission configuration selection.

It is to be noted that when the first type of information is the CSI, different sub-types of the CSI should be considered as different types. For example, the CRI, the RI, the PMI and the CQI may correspond to different transmission configuration selection.

For the response message, the transmission configuration selected for the case where the responded object is first transmitted data may be different from the transmission configuration selected for the case where the responded object is retransmitted data. Therefore, regardless of the manner of agreement in advance or the manner requiring the indication of the signaling of the base station, the terminal needs to determine the transmission configuration selection in conjunction of whether the responded data is first transmitted or retransmitted, as well as how many times the data has been retransmitted. If the corresponding transmission configuration set includes only one transmission configuration, this transmission configuration is directly used.

In step 104, the first type of information is transmitted according to the selected transmission configuration.

Embodiment 5

The terminal determines the transmission configuration set according to the information type included in the first type of information. Specific transmission configuration types are described in the subsequent embodiments. For specific manner for determining this set in this embodiment, reference may be made to the manner described in the embodiment 1.

There is one situation that one type of the first type of information corresponds to one transmission configuration set, as shown in Table 2.

TABLE 2

| | |
|---|---|
| Scheduling request message | Transmission configuration 11, transmission configuration 12 |
| Response message of the control information | Transmission configuration 21, transmission configuration 22 |
| Response message of the data information | Transmission configuration 31, transmission configuration 32 |
| Sending manner switching request information | Transmission configuration 41, transmission configuration 42 |
| Receiving manner switching feedback information | Transmission configuration 51, transmission configuration 52 |
| Indication information of information reporting mode | Transmission configuration 61, transmission configuration 62 |

The situation that one type of the first type of information corresponds to multiple configurations is listed herein. In one example, one type of the first type of information may correspond to only one configuration. In another example, part of the type of the first type of information corresponds to only one configuration, and part of the type of the first type of information corresponds to multiple configurations.

There is another situation that each of groups into which the first type of information is grouped corresponds to one transmission configuration set. There are several manners for grouping the transmission configuration sets.

The first preferable grouping manner is that a first group includes at least one of the scheduling request message, the response message, the BI, the CRI, the RI, the sending manner switching request information, the receiving manner switching feedback information, or the indication information of information reporting mode, and a second group includes at least one of: the CQI or the PMI, as shown in Table 3.

TABLE 3

| | |
|---|---|
| Group 1 of the first type of information | At least one of the response message, the BI, the CRI, the RI, the sending manner switching request information, the receiving manner switching feedback information, or the indication information of information reporting mode |
| Group 2 of the first type of information | At least one of the CQI or the PMI |

If there is the feedback of multiple PMIs including a long period, a first PMI fed back by a broadband, a short period and a second PMI fed back by a sub-band, the grouping manner at this time is as shown in Table 4.

TABLE 4

| | |
|---|---|
| Group 1 of the first type of information | At least one of the response message, the BI, the CRI, the RI, the sending manner switching request information, the receiving manner switching feedback information, the indication information of information reporting mode, or the first PMI |
| Group 2 of the first type of information | At least one of the CQI or a second PMI |

The second preferable grouping manner is that the first group includes at least one of the scheduling request message, the response message, the sending manner switching request information, the receiving manner switching feedback information, or the indication information of information reporting mode, and the second group includes at least one of pieces of the CSI, as shown in Table 5.

TABLE 5

| | |
|---|---|
| Group 1 of the first type of information | At least one of the scheduling request message, the response message, the sending manner switching request information, the receiving manner switching feedback information, or the indication information of information reporting mode |
| Group 2 of the first type of information | At least one of pieces of the CSI |

The third preferable grouping manner is that the first group includes at least one of the scheduling request message, the sending manner switching request information, the receiving manner switching feedback information, or the indication information of information reporting mode, and the second group includes at least one of the response message or the CSI, as shown in Table 6.

TABLE 6

| | |
|---|---|
| Group 1 of the first type of information | The scheduling request message, the sending manner switching request information, the receiving manner switching feedback information, and the indication information of information reporting mode |
| Group 2 of the first type of information | The response message, and the CSI |

In addition the two grouping manners described above, a manner for grouping more groups may also be easily extended. Some information with similar importance and sending frequency may be grouped into one group. Each group may correspond to one transmission configuration set.

One transmission configuration includes one or more set of transmission configurations. Different groups may correspond to different transmission configuration sets due to its different characteristics.

Embodiment 6

This embodiment is mainly used for describe some configuration types included in the transmission configuration. These configuration types mainly include:

at least one configuration of numerology.

In a general OFDM-based wireless communication system, basic transmission parameters mainly include following classifications: a time domain symbol length, the number of subcarriers, a subcarrier spacing, a frequency domain guard band, a cyclic prefix (CP), a time domain guard period (GP), and the number of points in fast Fourier transform (FFT) algorithm.

The time domain signal length refers to an OFDM symbol length. Modulation symbols are carried on M OFDM subcarriers. Modulation symbols are carried on M OFDM subcarriers, these subcarriers constitute a time domain sample point after transformed to the time domain, and the time domain sample point and the guard period form a time domain OFDM symbol. Generally speaking, the OFDM symbol length is related to the number and spacing of subcarriers in the frequency domain. That is, with the same bandwidth, the larger the number of subcarriers is and the smaller the subcarrier spacing is, the longer the OFDM symbol length is, which may be described as that with the same subcarrier spacing, the larger the number of subcarriers is, the longer the OFDM symbol length is, and vice versa.

The number of subcarriers refers to the number of subcarriers carrying the modulation symbols in the frequency domain corresponding to the same one OFDM symbol.

The subcarrier spacing refers to the spacing of center frequencies between the subcarriers. Generally speaking, in order or maintain orthogonality, the smaller the subcarrier spacing is, the higher requirements of required waveform are, and the longer a window in the time domain is, so that the longer the time domain symbol length is, and vice versa.

The frequency domain guard band refers to that some bandwidths on both sides are generally reserved as guard bands during the information transmission. For example, in the current LTE system with 20 MHz bandwidth, actually only 100 resource blocks (RBs) are used, and only 1200 subcarriers, that is, total 18 MHz bandwidth, are occupied, which means that 2 MHz guard bands are reserved. The guard bands are generally on both sides of the bandwidth and mainly used for avoiding impact of out-of-band emission on performance when other wireless communication systems send information.

The CP generally refers to some prefixes added in the front of some time domain sample points formed after the frequency domain signals are transformed into the time domain. The prefixes generally are copies of latter part of sample points of a string of time domain sample points. For example, a series of signals 0, 1, 2, 3, 4, 5, 6, 7, 8 and 9 to which a cyclic prefix with a length of 4 is added are signals 6, 7, 8, 9, 0, 1, 2, 3, 4, 5, 6, 7, 8 and 9.

For the time domain guard period (GP), during radio frequency (RF) precoding, switching from one precoding to another precoding requires certain processing time, so that similar guard periods are also required. Although some other places also have similar concepts of the guard period, various guard periods in the present application are all considered as one type of basic transmission parameters.

The number of points in fast Fourier transform (FFT) algorithm is generally related to the number of subcarriers and the bandwidth, but is not completely equal to the number of active subcarriers. For example, for a 20 MHz/10 MHz LTE system, in 2048 points and 1024 points are adopted respectively, the number of active subcarriers is just 1200 and 600 respectively.

In the present application, one or more sets of numerology parameters may be adopted. The type of basic parameter configuration included in each set may be one or more types mentioned above. The following are the types of configuration mentioned above:

at least one configuration of transmission area, where the configuration of transmission area includes a configuration of time domain transmission area, for example, the configuration on which sub-frame set, on which slot set, or on which OFDM symbol set; a configuration of frequency domain transmission area, for example the configuration on which subcarrier sets; or a combination thereof, for example the configuration on which RB sets of which subframes; various types of transmission areas define a set of multiple time-frequency domain resource areas; and these areas may be pre-configured;

at least one configuration of sending code sequence set, where the code sequence is also a kind of resource, so that which code sequences are available is also one configuration of candidate transmission resources and may be considered as one type of transmission configuration;

at least one configuration of sending power;

at least one configuration of sending times, where some information may be repeatedly sent continuously so as to acquire higher robustness, and the sending times is one type of transmission configuration;

at least one configuration of sending resource quantity, where different quantities of sending resources have different robustness, the information is sent by using larger quantities of resources so as to acquire higher robustness, and the sending resource quantity is one type of transmission configuration;

at least one configuration of sending resource granularity;

at least one of modulation manner, including binary phase shift keying (BPSK), quadrature phase shift keying (QPSK) and other modulation manners;

a configuration of coding manner, including a code rate, a coding type, and an aggregation level of the control information;

a configuration of sending manner, including a sending beam configuration, a sending antenna configuration, a sending sector configuration, and a configuration of transmission technology or mode; and a configuration of receiving manner, including a receiving beam configuration, a receiving antenna configuration, and a receiving sector configuration.

Embodiment 7

In step 201, a first type of information is determined.

The first type of information includes: a response message, a scheduling request message, channel state information (CSI), sending manner switching request information, receiving manner switching feedback information, and indication information of information reporting mode, which are mentioned above.

At each time instant, the terminal needs to determine the content of information which needs to be reported according to a current feedback mode, trigger signaling of the base station, and some agreements with the base station. At the same time instant, there may be only one type of the first type of information which needs to be reported, or there may be various types of the first type of information which needs to be reported. When various types of information need to be reported, they may be combined and reported, or may be reported separately.

In step 202, a candidate transmission area set corresponding to the first type of information is determined.

The candidate transmission area set at least includes a number M of transmission areas, where M is an integer greater than 1.

This transmission area set may be appointed in advance or may be configured. Since the transmission area set is also a type of representation form of the transmission area set, reference may be made to the embodiment 1.

In step 203, a number N of transmission areas are selected from the transmission area set, where 1<=N<=M, and N is an integer.

Since the transmission area is also a type of transmission configuration, reference may be made to the Embodiment.

In step 204, the first type of information is transmitted in the N selected transmission areas.

In an embodiment, in order to provide various types of sending power so as to meet transmission requirements of the first information, different terminals and different link quality, the M transmission areas at least include an area i and an area j, and for transmission in the area i and the area j, a sending power offset P exists between the area i and the area j, where the sending power offset P is configured by a base station.

In an embodiment, in order to provide various types of sending power so as to meet transmission requirements of the first information, different terminals and different link quality, the M transmission areas at least include an area i and an area j, and for transmission in the area i and the area j, a sending beam used for the area i is a subset of a sending beam used for the area j, a sending antenna used for the area i is a subset of a sending antenna used for the area j, a sending sector used for the area i is a subset of a sending sector used for the area j, a receiving beam used for the area i is a subset of a receiving beam used for the area j, a receiving antenna used for the area i is a subset of a receiving antenna used for the area j, a receiving sector used for the area i is a subset of a receiving sector used for the area j, a length of a cyclic prefix (CP) of an orthogonal frequency division multiplexing (OFDM) symbol used for the area i is less than a length of a CP of an OFDM symbol used for the area j, a length of a subcarrier spacing used for the area i is less than a length of a subcarrier spacing used for the area j, a bandwidth of the area i is less than a bandwidth of the area j, or a number of OFDM symbols of the area i is less than a number of OFDM symbols of the area j.

In an embodiment, in order to provide various types of sending power so as to meet transmission requirements of the first information, different terminals and different link quality, the M transmission areas at least include an area i and an area j, and for transmission in the area i and the area j, a time domain symbol corresponding to the area i is a subset of a time domain symbol corresponding to the area j, a resource block occupied by the area i is a subset of a resource block occupied by the area j, or the area i and the area j use different numerology parameters, where the different numerology parameters include at least one of: different time domain symbol lengths, different subcarrier spacings, different subcarrier densities, different CP lengths, different frequency domain guard bands, or different guard periods (GPs).

In an embodiment, the M transmission areas correspond to M subframe sets configured by the base station, or the M transmission areas correspond to M resource block sets configured by the base station.

Embodiment 8

In step 301, a first type of information is divided into M groups according to information types, where each group of the first type of information corresponds to a respective transmission configuration set, the transmission configuration set includes at least one transmission configuration, and M is an integer greater than or equal to 1.

In step 302, a group to which the first type of information to be sent belongs is determined, a transmission configuration is selected from the transmission configuration set corresponding to this group.

In step 303, the first type of information is sent according to the selected transmission configuration.

The grouping manner has been described in embodiment 2. Different pieces of information may be divided into different groups to correspond to different transmission configuration sets or different transmission configuration selection. Following grouping effect may be implemented:

a first PMI is divided into a first group, and a second PMI is divided into a second group;

a BI is divided into the first group, and a PMI and/or a CQI is divided into the second group;

an RI is divided into the first group, and the PMI and/or the CQI is divided into the second group;

a CRI is divided into the first group, and the PMI and/or the CQI is divided into the second group;

a response message is divided into the first group, and the PMI and/or the CQI is divided into the second group;

the response message is divided into the first group, and CSI is divided into the second group;

a scheduling request message is divided into the first group, and the CSI and/or the response message is divided into the second group;

sending manner switching request information is divided into the first group, and the CSI and/or the response message is divided into the second group;

receiving manner switching feedback information is divided into the first group, and the CSI and/or the response message is divided into the second group;

indication information of information reporting mode is divided into the first group, and the CSI and/or the response message is divided into the second group; and the response message for control is divided into the first group, and the response message for data is divided into the second group.

Different groups may adopt different configuration sets or configuration selection so as to meet characteristics of information types included in the groups, such as importance or transmission frequency. In an embodiment, for some grouping manners mentioned in embodiment 2 and this embodiment, sending power corresponding to the second group is less than or equal to sending power corresponding to the first group, a number of sending sectors corresponding to the second group is less than or equal to a number of sending sectors corresponding to the first group, a sending sector of the second group is a subset of a sending sector of the first group, a number of sending antennas corresponding to the second group is less than or equal to a number of sending antennas corresponding to the first group, a sending antenna of the second group is a subset of a sending antenna of the first group, a number of sending beams corresponding to the second group is less than or equal to a number of sending beams corresponding to the first group, a sending beam of the second group is a subset of a sending beam of the first group, a sending bandwidth of the second group is less than or equal to a sending bandwidth of the first group, a number of sending symbols of the second group is less than or equal to a number of sending symbols of the first group, a sending symbol set of the second group is a subset of a sending symbol set of the first group, a number of sending resource blocks of the second group is less than or equal to a number of sending resource blocks of the first group, a sending resource block set of the second group is a subset of a sending resource block set of the first group, or a candidate transmission technology set of the second group is a subset of a candidate transmission technology set of the first group.

Embodiment 9

This embodiment describes a configuration method in which a base station sends a first type of information. The first type of information include at least one of: a response message, a scheduling request message, CSI information, sending manner switching request information, receiving manner switching feedback information or indication information of information reporting mode. The base station determines a transmission configuration of the first type of information according to current link transmission quality or according to both importance and robustness requirements of the first type of information. The base station may send downlink control information at a physical layer. The downlink control information is used for indicating the transmission configuration selection of the uplink first type of information within a period of time. Some types of the transmission configuration have already been described in the above embodiments and will not be described herein.

Embodiment 10

This embodiment describes a configuration method in which the terminal selects and sends the first type of information, and notifies that to the base station. The first type of information include at least one of: a response message, a scheduling request message, CSI, sending manner switching request information, receiving manner switching feedback information or indication information of information reporting mode. The terminal may determine a transmission configuration of the first type of information according to current link transmission quality or according to both importance and robustness requirements of the first type of information. The terminal may send uplink control information at a physical layer. The uplink physical layer control information is used for indicating the transmission configuration selection of the uplink first type of information within a period of time.

Generally, since there are differences between the transmission of the uplink control information and the transmission of other uplink control information, the uplink first type of information may adopt a transmission configuration different from that of the other uplink control information and the transmission configuration may be appointed in advance. Some types of the transmission configuration described in this embodiment have already been described in the above embodiments and will not be described herein.

Apparently, it should be understood by those skilled in the art that each of the above-mentioned modules or steps of the present application may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executable by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The above are only preferred embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

INDUSTRIAL APPLICABILITY

The present application relates to communications. In the present application, a transmission configuration set corresponding to uplink control information to be sent is determined, a transmission configuration is selected from the transmission configuration set, and the uplink control information to be sent is transmitted according to the selected transmission configuration, thereby guaranteeing both robustness and high transmission efficiency at the same time.

What is claimed is:
1. An uplink control information transmission method, comprising:
determining a candidate transmission area set corresponding to uplink control information to be set which comprises at least one of: a response message, a scheduling request message, channel state information (CSI), sending manner switching request information, receiving manner switching feedback information, or indication information of information reporting mode, wherein the candidate transmission area set at least comprises a number M of transmission areas, and M is an integer greater than 1;
  selecting a number N of transmission areas from a transmission configuration set, wherein N is greater than or equal to 1 and is less than or equal to M, and N is an integer; and
  performing a transmission of the uplink control information to be sent according to the N selected transmission areas,
  wherein the M transmission areas at least comprise a first area i and a second area j,
  for the transmission in the first area i and the second area j, a sending beam used for the first area i is a subset of a sending beam used for the second area j; and/or for the transmission in the first area i and the second area j, a sending antenna used for the first area i is a subset of a sending antenna used for the second area j; and/or for the transmission in the first area i and the second area j, a length of a subcarrier spacing used for the first area i is less than a length of a subcarrier spacing used for the second area j; and/or a time domain symbol corresponding to the first area i is a subset of a time domain symbol corresponding to the second area j; and/or a resource block occupied by the first area i is a subset of a resource block occupied by the second area j; and/or the M transmission areas correspond to M resource block sets configured by the base station.

2. The uplink control information transmission method of claim 1, wherein for the transmission in the first area i and the second area j, a sending power offset P exist between the first area i and the second area j, wherein the sending power offset P is configured by a base station; and/or for the transmission in the first area i and the second area j, a sending sector used for the first area i is a subset of a sending sector used for the second area j; and/or for the transmission in the first area i and the second area j, a receiving beam used for the first area i is a subset of a receiving beam used for the second area j; and/or for the transmission in the first area i and the second area j, a receiving antenna used for the first area i is a subset of a receiving antenna used for the second area j; and/or for the transmission in the first area i and the second area j, a receiving sector used for the first area i is a subset of a receiving sector used for the second area j; and/or for the transmission in the first area i and the second area j, a length of a cyclic prefix (CP) of an orthogonal frequency division multiplexing (OFDM) symbol used for the first area i is less than a length of a CP of an OFDM symbol used for the second area j; and/or for the transmission in the first area i and the second area j, a bandwidth of the first area i is less than a bandwidth of the second area j; and/or for the transmission in the first area i and the second area j, a number of OFDM symbols of the first area i is less than a number of OFDM symbols of the second area j; and/or the first area i and the second area j use different numerology parameters; and/or the M transmission areas correspond to M subframe sets configured by the base station.

3. The uplink control information transmission method of claim 2, wherein the different numerology parameters comprise at least one of: different time domain symbol lengths, different subcarrier spacings, different subcarrier densities, different CP lengths, different frequency domain guard bands, or different guard periods (GPs).

4. An uplink control information transmission device, comprising a processor and a memory storing processor-executable instructions which, when executed by the processor, execute the uplink control information transmission method of claim 1.

5. An uplink control information transmission method, comprising:

determining a group to which uplink control information to be sent belongs according to at least one group into which uplink control information is divided in advance, wherein each of the at least one group of uplink control information corresponds to a respective transmission configuration set, and the transmission configuration set comprises at least one transmission configuration;

selecting the transmission configuration from the transmission configuration set corresponding to the group to which the uplink control information to be sent belongs; and transmitting the uplink control information to be sent according to the selected transmission configuration, wherein the uplink control information comprises at least one of:

a response message, a scheduling request message, channel state information (CSI), sending manner switching request information, receiving manner switching feedback information, or indication information of information reporting mode, wherein the CSI at least comprises:

a channel quality indicator/index (CQI), a precoding matrix indicator (PMI), a rank indicator (RI) of a channel, a channel state information reference signal resource indicator/index (CRI), port selection information, and a beam indicator/index (BI), wherein the method further comprises:

dividing the uplink control information into two groups, wherein a first group of the two groups comprises at least one of: the scheduling request message, the response message, the BI, the CRI, the RI, the sending manner switching request information, the receiving manner switching feedback information, or indication information of information reporting mode, and a second group comprises at least one of: the CQI or the PMI; or the first group comprises at least one of: the scheduling request message, the response message, the BI, the CRI, the RI, the sending manner switching request information, the receiving manner switching feedback information, the indication information of information reporting mode or a first PMI, and the second group comprises at least one of: the CQI or a second PMI; or the first group comprises at least one of: the scheduling request message, the response message, the sending manner switching request information, the receiving manner switching feedback information, or the indication information of information reporting mode, and the second group comprises at least one of pieces of information included in the CSI; or the first group comprises at least one of: the scheduling request message, the sending manner switching request information, the receiving manner switching feedback information, or the indication information of information reporting mode, and the second group comprises at least one of: the response information and or at least one of pieces of information in the CSI, wherein, a sending sector of the second group is a subset of a sending sector of the first group; and/or a sending antenna of the second group is a subset of a sending antenna of the first group; and/or a sending beam of the second group is a subset of a sending beam of the first group; and/or a sending symbol set of the second group is a subset of a sending symbol set of the first group; and/or a sending resource block set of the second group is a subset of a sending resource block set of the first group.

6. The uplink control information transmission method of claim 5, wherein the method further comprises:

dividing the information into a number X of groups according to a type of the uplink control information, wherein X is an integer greater than or equal to 1.

7. The uplink control information transmission method of claim 5, wherein
sending power corresponding to the second group is less than or equal to sending power corresponding to the first group; and/or
a number of sending sectors corresponding to the second group is less than or equal to a number of sending sectors corresponding to the first group; and/or
a number of sending antennas corresponding to the second group is less than or equal to a number of sending antennas corresponding to the first group; and/or
a number of sending beams corresponding to the second group is less than or equal to a number of sending beams corresponding to the first group; and/or
a sending bandwidth of the second group is less than or equal to a sending bandwidth of the first group; and/or
a number of sending symbols corresponding to the second group is less than or equal to the number of sending symbols corresponding to the first group; and/or
a sending resource block of the second group is less than or equal to a sending resource block of the first group; and/or
a candidate transmission technology set of the second group is a subset of a candidate transmission technology set of the first group.

8. An uplink control information transmission device, comprising a processor and a memory storing processor-executable instructions which, when executed by the processor, execute the uplink control information transmission method of claim 5.

9. An uplink control information transmission configuration indication method, comprising:
determining a transmission configuration of uplink control information to be sent which comprises at least one of: a response message, a scheduling request message, channel state information (CSI), sending manner switching request information, receiving manner switching feedback information, or indication information of information reporting mode; and
sending the uplink control information, wherein the uplink control information is used for indicating the transmission configuration of the uplink control information to be sent within a preset duration,
wherein the transmission configuration comprises at least one of:
a configuration of numerology, a configuration of sending code sequence set, a configuration of sending power, a configuration of sending times, a configuration of sending resource quantity, a configuration of sending resource granularity, a configuration of modulation manner, a configuration of coding manner, a configuration of sending manner, a configuration of receiving manner, or a configuration of transmission area.

10. The uplink control information transmission configuration indication method of claim 9, wherein
the configuration of numerology comprises at least one of: a time domain symbol length, a subcarrier spacing, a number of points in fast Fourier transformation (FFT) algorithm, a subcarrier density, a cyclic prefix (CP) length, a frequency domain guard band, or a guard period (GP); and/or
the configuration of the transmission area comprises: a time domain transmission area configuration and/or a frequency domain transmission area configuration; and/or
the configuration of the coding manner comprises at least one of: a code rate, a coding type, or an aggregation level; and/or
the configuration of sending manner comprises at least one of: a sending beam configuration, a sending antenna configuration, a sending sector configuration, or a configuration of transmission technology or mode; and/or
the configuration of receiving manner comprises at least one of: a receiving beam configuration, a receiving antenna configuration, or a receiving sector configuration.

* * * * *